US008102988B2

(12) United States Patent
Gavillet et al.

(10) Patent No.: US 8,102,988 B2
(45) Date of Patent: Jan. 24, 2012

(54) METHOD AND SYSTEM FOR DYNAMICALLY TERMINATING WIRELESS AND WIRELINE CALLS BETWEEN CARRIERS

(75) Inventors: Ronald W. Gavillet, Glencoe, IL (US); Jeffrey H. Hartzell, Chicago, IL (US); Richard H. Anderson, Lake Zurick, IL (US); James P. Hynes, Riverside, CT (US); Jeffrey C. Wells, Carpenterville, IL (US); John R. Barnicle, Western Springs, IL (US)

(73) Assignee: Neutral Tandem, Inc., Chicago, IL (US)

( * ) Notice: Subject to any disclaimer, the term of this patent is extended or adjusted under 35 U.S.C. 154(b) by 1620 days.

(21) Appl. No.: 11/253,383

(22) Filed: Oct. 19, 2005
(Under 37 CFR 1.47)

(65) Prior Publication Data
US 2006/0193461 A1 Aug. 31, 2006

Related U.S. Application Data

(60) Provisional application No. 60/620,591, filed on Oct. 20, 2004.

(51) Int. Cl.
*H04M 7/00* (2006.01)
(52) U.S. Cl. .............................. 379/220.01; 379/221.13
(58) Field of Classification Search ............. 379/220.01, 379/221.13, 224, 219, 230; 455/414.1, 445
See application file for complete search history.

(56) References Cited

U.S. PATENT DOCUMENTS

| | | | | |
|---|---|---|---|---|
| 5,579,379 A | * | 11/1996 | D'Amico et al. | 379/114.01 |
| 5,805,997 A | * | 9/1998 | Farris | 455/461 |
| 5,930,348 A | * | 7/1999 | Regnier et al. | 379/221.01 |
| 6,804,229 B2 | | 10/2004 | Landaveri et al. | 370/386 |
| 6,856,598 B1 | * | 2/2005 | Stanfield | 370/235 |
| 2001/0034796 A1 | | 10/2001 | Zebian | 709/245 |
| 2001/0038689 A1 | | 11/2001 | Liljestrand et al. | 379/201.03 |
| 2002/0052915 A1 | | 5/2002 | Amin-Salehi | 709/203 |
| 2003/0067903 A1 | | 4/2003 | Jorgensen | 370/338 |
| 2003/0108176 A1 | * | 6/2003 | Kung et al. | 379/211.02 |
| 2003/0161296 A1 | | 8/2003 | Butler et al. | 370/352 |
| 2003/0198216 A1 | | 10/2003 | Lewis | 370/352 |
| 2004/0057427 A1 | * | 3/2004 | Christie et al. | 370/352 |
| 2005/0186950 A1 | * | 8/2005 | Jiang | 455/417 |

(Continued)

*Primary Examiner* — William Deane, Jr.
(74) *Attorney, Agent, or Firm* — Neal, Gerber & Eisenberg LLP

(57) ABSTRACT

A third party tandem provider that intercepts and routes voice and data traffic between telecommunications carriers, e.g., wireless carriers, local exchange carriers, and long distance carriers, by dynamically determining the actual terminating switch for a call using a plurality of proprietary databases versus terminating calls merely based on the switch associated with the terminating telephone number. The tandem services provider Service Control Point (SCP) is arranged to maintain a carrier unit's status in a resident database or secure such information per call from the terminating carrier's database. When a call is placed to a telephone number associated with a carrier connected to the tandem, the tandem platform Service Switching Point (SSP) queries the SCP for availability and routing instructions. In response, the SCP accesses its database and/or the terminating carrier's database to determine the status of the unit. If the unit is available, the SCP sends the SSP the unit's current service address (e.g., IP address, telephone number, location routing number) to route the call to the switching location currently serving the subscriber unit. If the unit is unavailable, the SCP sends the SSP the information to route the call to the home switch associated with the called unit for announcement, voice mail, or other treatment. The terminating carrier thus avoids the internal routing inefficiencies of re-directing the call within its network.

2 Claims, 3 Drawing Sheets

U.S. PATENT DOCUMENTS

| | | | |
|---|---|---|---|
| 2007/0147391 A1* | 6/2007 | Wilhoite et al. | 370/395.52 |
| 2008/0064409 A1* | 3/2008 | Goering et al. | 455/445 |
| 2009/0143058 A1* | 6/2009 | Peon et al. | 455/418 |
| 2009/0225974 A1* | 9/2009 | Kafka | 379/211.02 |
| 2010/0297987 A1* | 11/2010 | Yu et al. | 455/414.1 |

* cited by examiner

METHOD AND SYSTEM FOR DYNAMICALLY TERMINATING WIRELESS AND WIRELINE CALLS BETWEEN CARRIERS

CROSS-REFERENCE TO RELATED APPLICATIONS

This application claims the benefit of U.S. Application Ser. No. 60/620,591, filed Oct. 20, 2004, the entire disclosure of which is hereby incorporated by reference as if fully set forth herein.

This application is related to U.S. patent application Ser. No. 10/087,363, filed Mar. 1, 2002, the entire disclosure of which is hereby incorporated by reference as if fully set forth herein.

FIELD OF THE INVENTION

The present invention relates generally to telecommunications networks and, more particularly, to a system and a method for dynamically determining the actual termination point of a call when that point is not representative of the telephone number assigned to the unit for traffic between carriers connected to a third party tandem services provider.

BACKGROUND OF THE INVENTION

The basic telephone numbering plan administration system ("NPA") used universally in telephony today, whether for conventional wireline or wireless service, is based on geographical assignment. Generally, wireline and wireless mobile communication systems operate subscriber terminal units with unique directory numbers that are geographically associated to one home switch within the carrier's network and these switches and directory numbers are assigned on a geographical basis determined by the subscriber's home or business physical location. In this configuration, call delivery between systems is performed through static call translations, routing and service databases that route the terminating call to the home switch associated with the subscriber unit.

In other words, when a call is made to a subscriber unit's telephone number, the call is delivered by a carrier to a switch assigned to serve the subscriber's unit. Upon receipt of the call from the carrier, the home serving switch associated with that telephone number will execute a query to an appropriate Service Control Point (SCP), which is a system that includes a database, to obtain special routing instructions. Information contained within the SCP database is used by the switching system to route the call within the terminating carrier's network, including between switching and over inter-switch transport, to the subscriber's unit (for example, in wireline telephony, when the subscriber has invoked a call-forwarding service to another termination point).

For wireless subscribers, in response to this query, the SCP will then query the associated mobile service provider terminal location register (Home or Visitor Location Register HLR/VLR) by using industry standard IS-41 Location Request messaging. Upon request, the mobile switching system will poll the mobile terminal unit to determine the availability and location of the mobile terminal unit. Once determined, the mobile system replies to the SCP query with a Location.sub.—Request return signal to report the mobile terminal unit's status. If the mobile unit is available, the mobile system returns the mobile's identification number to the SCP for call delivery routing to the identified mobile terminal unit. If the mobile user is not in the serving area of the home switch associated with the called telephone number, the wireless carrier must utilize valuable internal network routing resources, including switch capacity and transport between switches, to route the call to the appropriate switch presently serving the terminating unit. If the mobile system replies to the SCP query indicating that the mobile terminal unit is unavailable, the switching system will direct the terminating call delivery to the home switch serving the subscriber's unit for proper treatment (e.g., announcement, voice mail, or other treatment).

Voice-over-Internet-Protocol (VoIP) calls present another variation in call handling and promise a much higher degree of personal mobility. Whether wireless or wired, the subscriber unit does not necessarily have a "directory number" permanently associated with the unit. Instead, when a subscriber connects to the Internet the user indicates that he/she is available at a particular address. For example, using the up and coming internet standard Session Initiation Protocol (SIP) for call setup, modification and teardown, when a user first connects to the network a SIP REGISTER request is sent to a Registrar database that maps the directory number (and the user's associated IP address) with the current physical (layer 2) network address of the subscriber's SIP device. In this way, calls can be routed to either the user's office, home or mobile SIP-phone, whichever is the current location of the user. Alternatively, using the older H.323 architecture and H.225 signaling, gatekeeper(s) perform a similar function, providing a translation service between real IP addresses and aliases.

While both known systems have been successful in providing terminating call delivery to subscriber units, the results are less than satisfactory. Inefficiencies in these call delivery techniques have resulted in wasted capital resources, increased operating expenses, and latent call delivery rates due to unnecessary internal call routing within the terminating carrier's network. This is particularly true in cases where (say) a GSM mobile phone is roaming in a foreign country or in the VoIP case (actually promoted/encouraged by VoIP providers), where the home directory number has been allocated from the numbers assigned to a foreign country, to provide a sort of super Foreign Exchange (FX) service. In addition, call completion and service quality can be negatively impacted by unnecessarily routing calls through multiple switches and over inter-switch transport. Much of this inefficient internal routing could be eliminated or sharply reduced if the calls were simply terminated to the switch presently serving the subscriber unit, versus the switch associated with the called telephone number. Therefore, a need exist for a system and method for dynamically determining, before handing a call off to the terminating carrier, the switch presently serving the called subscriber's unit and terminating calls to that switch versus terminating calls merely based on the switch associated with the terminating telephone number.

SUMMARY OF THE INVENTION

It is therefore an objective of the present invention to provide a method and system for dynamically determining the actual terminating switch for a call between carriers connected to a third party tandem services provider and instructing the tandem services provider to direct call delivery to the terminating carrier's switch presently serving the called subscriber unit, thereby limiting the need for inefficient internal call routing within the terminating carrier's network caused by terminating calls merely based on the switch associated with the terminating telephone number.

It is another objective of the present invention to provide a method and system for location reporting methods by subscriber units to provide information needed to dynamically determine call termination and delivery instructions to a tandem services provider SCP database independent of incoming call delivery requests from the originating carrier.

In accordance with these and other objects, the present invention provides a method and system for a tandem services provider to route call traffic originated from a plurality of carriers by monitoring the status of the called subscriber unit to determine availability to receive call traffic and automatically sending data representative of the status of the subscriber unit and the terminating switch presently serving the unit to the tandem services provider SCP in order to terminate such call. Based on the information either stored in the tandem services provider SCP database or retrieved from the terminating carrier's subscriber location database by the SCP, the SCP provides either routing information to route the call to the terminating carrier presently serving the subscriber unit or routes the call to the home switch associated with the telephone for the subscriber unit, if the unit is unavailable to receive call traffic. In a preferred embodiment, the tandem services provider location status data is continually or routinely updated in the SCP database in response to changes in registration status for the subscriber unit versus retrieving the terminating carrier's subscriber location from the terminating carrier's database.

Unlike previous techniques that rely upon the terminating carrier's network for inefficient internal call routing within the terminating carrier's network to route the call between the switch associated with the subscriber unit's telephone number and the switch presently serving the subscriber unit, the present invention provides a proactive technique that allows the tandem services provider to request application of the call terminating instructions directly from the terminating carrier's location database, using for example with wireless subscribers Registration.sub.—Notification or Route.sub.—Request messaging. Thus, a higher call completion and increased service quality is achieved at the same time call termination expense and capital resources are reduced as a resulting of the direct termination of traffic from the tandem services provider to the terminating carrier's switch presently serving the subscriber unit. In addition, the dynamic terminating properties of the present invention are independent of a subscriber unit's geographical location. By providing dynamic termination, the present invention provides call delivery instructions that are autonomous and not statically dictated by predetermined, geographically based routing processes.

Similarly, in a future all-VoIP network, voice packets will not have to be transported back to a home switch because the registration process described above will result in a call being efficiently re-directed via an IP router/switch at the first or earliest opportunity that the call packets encounter. However, in the foreseeable future of a mixed IP-TDM (circuit-switched) environment, when a call is made from a traditional circuit-switched wireline/wireless subscriber to a VoIP subscriber, there will again be a query to the appropriate SCP database to enable the routing of the call via a forwarding telephone number or else determining the IP address associated with the number, converting the circuit-switched TDM call to IP and routing the call to its terminating location via the IP address, the latter two functions being performed by a media gateway and signaling gateway respectively.

BRIEF DESCRIPTION OF THE DRAWINGS

The above objects and other objects, features, and advantages of the present invention are readily apparent from the following detailed description of the best mode for carrying out the invention when taken in connection with the accompanying drawings wherein like reference numerals correspond to like components.

DETAILED DESCRIPTION OF ILLUSTRATIVE EMBODIMENTS

Figure 1:
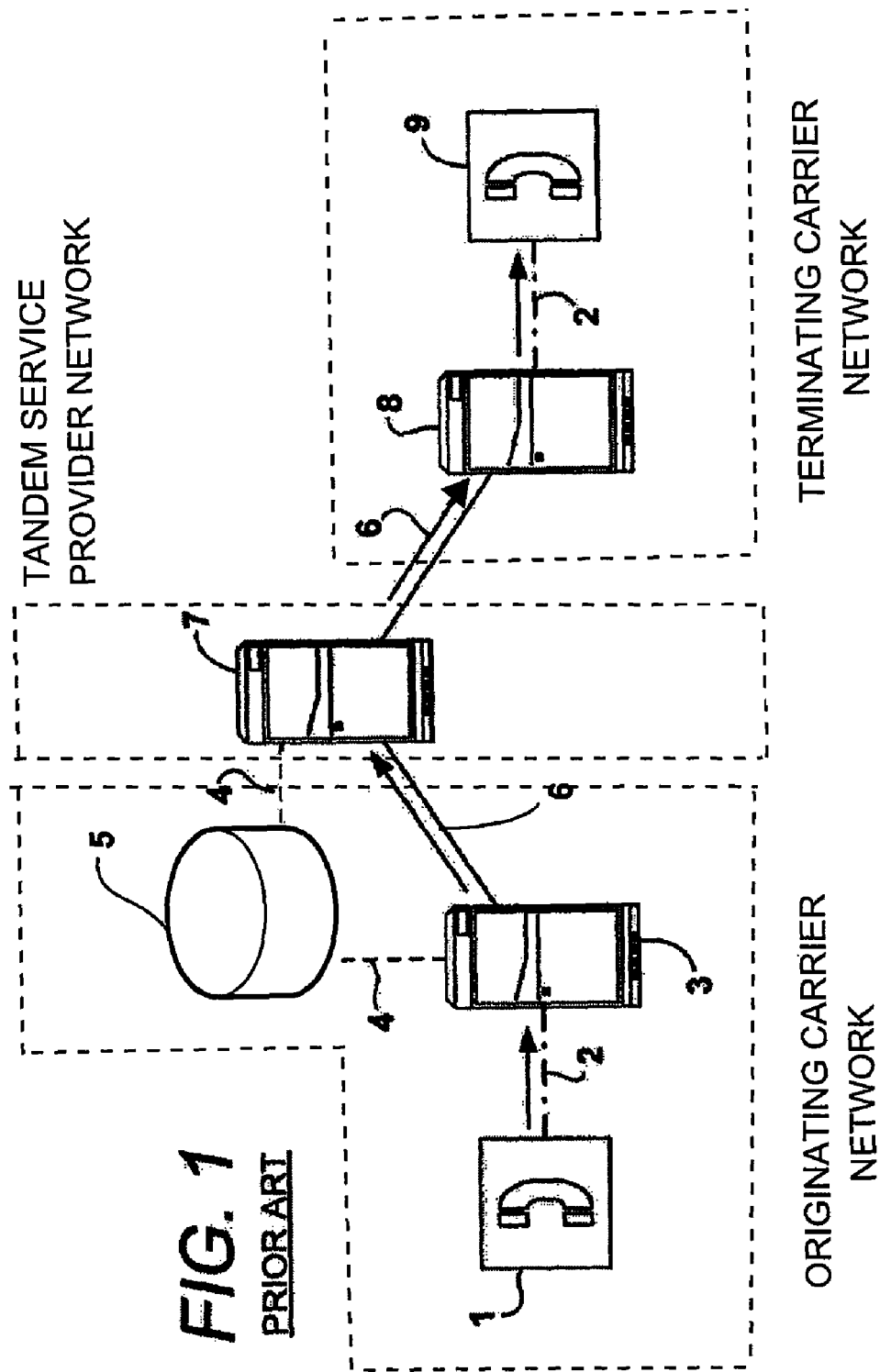
FIG. 1 is a diagram of a prior art tandem services network including a tandem services switch 7 and transport 6 between the tandem services switch 7 and the wireless and wireline switches 3, 8 connected to the tandem services switch 7.

FIG. 1 is a diagram of a prior art tandem services network as described in commonly owned U.S. patent application Ser. No. 10/087,363, the contents of which are incorporated by reference. In FIG. 1, a transport 6 connects the tandem service provider switch 7 and the wireless and wireline switches 3, 8. FIG. 1 shows a call that starts with the subscriber unit 1 of wireline or wireless carrier associated with switch 3 dialing a telephone number of a subscriber unit 9 served by another wireline or wireless carrier associated with switch 8. The call is routed from the calling subscriber unit 1 over the local loop or via wireless signal 2 between the calling subscriber unit 1 and the originating carrier switch 3 serving the calling subscriber unit 1. The originating carrier switch 3 receiving the call sends a request via SS7 4 to a routing database 5 (such as the LERG) to determine where to direct the call based on the home switch associated with the called telephone number. Upon determining to direct the call to the tandem services switch 7 in order for the call to be terminated to the terminating carrier home switch 8 serving the subscriber unit 9, the call is sent over the transport 6 connecting the originating carrier home switch 3 to the tandem services switch 7. Transmitted with the call is the SS7 routing information 4, which informs the tandem services switch 7 of the terminating carrier home switch 8 to direct the call to. The tandem services switch 7 then routes the call over transport 6 between the tandem services switch 7 and the terminating carrier's home switch 8 serving the called party's telephone number. The call is then routed from the terminating carrier's home switch 8 over either local loop connections or via a wireless signal 2 to the called subscriber unit 9. Not shown are prior art network elements including Signaling Transfer Points (STPs) and Service Control Points (SCPs) including databases that are used to perform call processing on calls that originate, tandem or terminate at assigned sites. STPs are used to facilitate call and feature control signal routing between switching systems and external SCPs, as well as a plurality of subscriber units. Common Channel Signaling System No. 7 (SS7) is employed to support communication of signaling information relating to call setup, control, management and maintenance and inter-network system signaling within and between carrier networks. The tandem services provider network may be affiliated with any third party tandem services provider.

Figure 2:
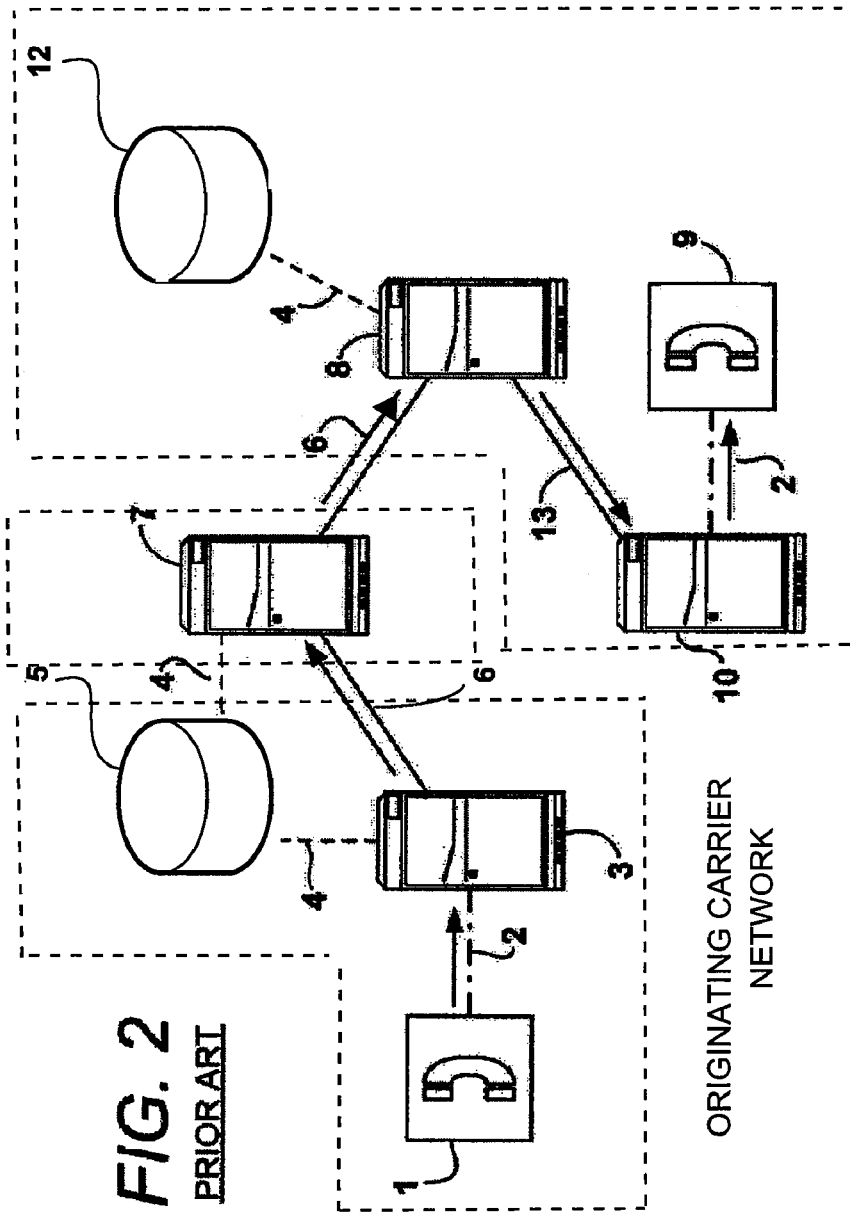
FIG. 2 is also a diagram of a prior art tandem services network, but in this diagram the called subscriber unit 9 is not in the serving area of the home switch 8 associated with the called subscriber unit 9, but rather is presently being served off of another switch in the terminating carrier's network, terminating carrier network switch 10.

FIG. 2 also illustrates a prior art system; however, in this diagram the called subscriber unit 9 is not in the serving area of the terminating carrier's home mobile switch 8 within the network associated with the called subscriber unit 9, but rather is presently being served off of a terminating carrier switch 10 within the terminating carrier network. Assuming the called subscriber unit 9 is a mobile subscriber, the switch 10 serving the called subscriber unit 9 would include a wireless location register (a Home Location Register/Visitor Location Register (VLR/HLR)) 12. The functions performed by wireless location register 12 may be carried out either within the terminating carrier's home mobile switch 8 (particularly if such an element is employed in the wireless network), or external thereto. Together, both the terminating carrier's home mobile switch 8 and wireless location register 12 are responsible for management and processing of calls to and from mobile subscriber unit 9. The basic operations of all the above components are generally known to one skilled in the art. In general, the terminating carrier's home switch 8 operates as a digital telephone exchange and controls call delivery within the terminating carrier's mobile network associated with switches 8 and 10 for mobile-to-mobile calls, as well as between the mobile network and the tandem services switch 7 for wireline-to-mobile, mobile-to-wireline, and mobile-to-other mobile carrier calls. The tandem service provider trunk 6 is used between the tandem services switch 7 and the terminating carrier's mobile switch 8 to facilitate call delivery.

In FIG. 2, when the terminating carrier's home mobile switch 8 receives a call from the tandem services switch 7 which is directed to a wireless subscriber unit 9, the terminating carrier's home mobile switch 8 deciphers the telephone number and alerts appropriate Base Station Controllers (not shown) to page the corresponding wireless subscriber unit 9. The wireless location register 12 operates as a master database for storing data related to each mobile subscriber, such as subscriber profile and mobility information together with relevant permanent data, such as access capabilities and subscriber services. In addition, the wireless location register 12 provides the terminating carriers home mobile switch 8 with information regarding the location and status of a mobile subscriber unit to allow incoming calls to be routed to the switch currently serving the subscriber unit. In FIG. 2, upon receiving the call from the tandem services switch 7, the terminating carrier's home mobile switch 8 of the subscriber unit 9 accesses via an SS7 link the wireless location register 12 to determine where to terminate the call. Upon receiving information that the called subscriber unit 9 is being served by another switch in the terminating carrier's network, the call is routed over inter-switch transport 13 within the terminating carrier's network to the terminating carrier switch 10 serving the subscriber unit and on to the subscriber unit 9 via wireless signal 2.

Figure 3:
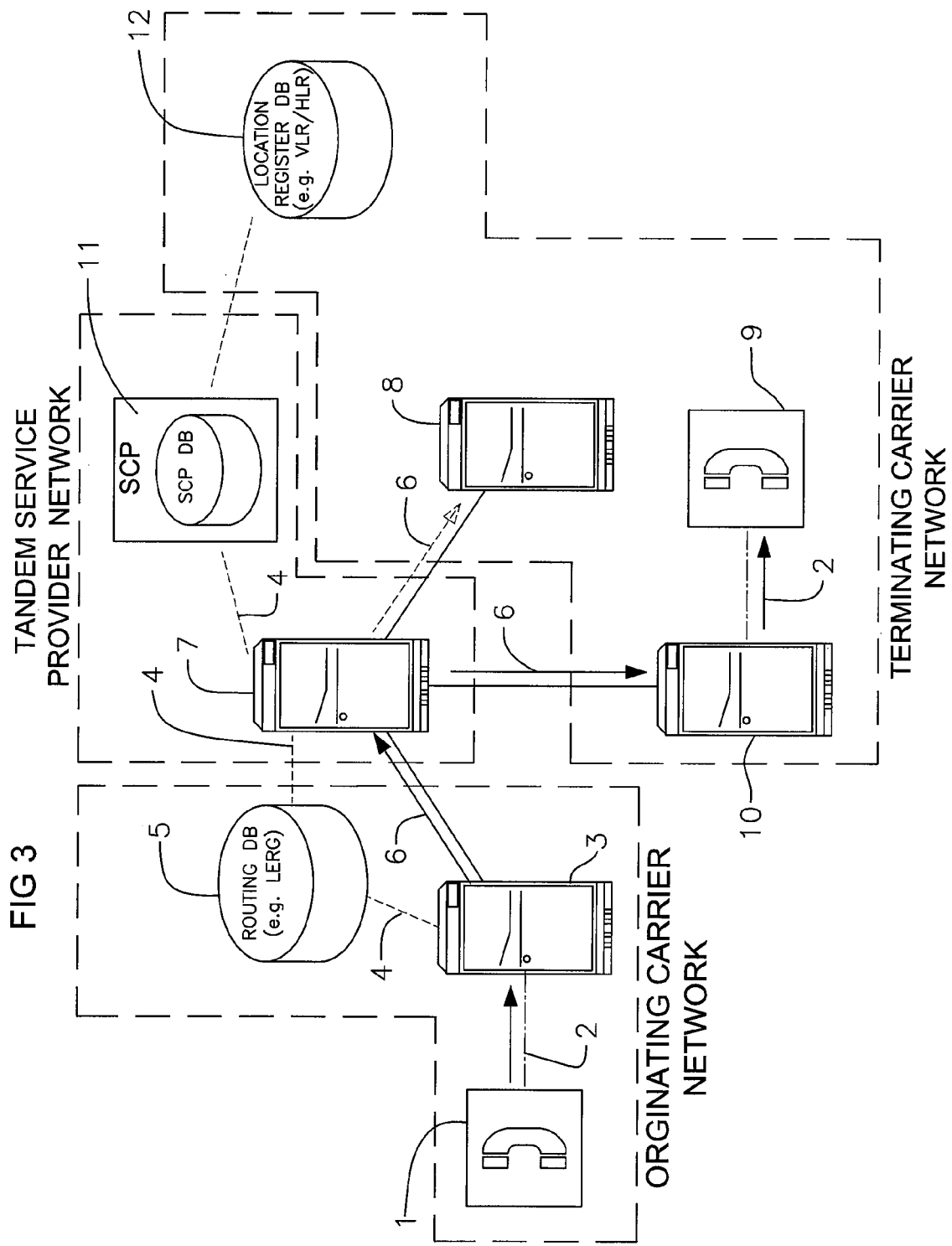
FIG. 3 illustrates the present invention whereby a carrier connected to a third party tandem services provider network, including the tandem services switch 7, maintains a subscriber unit location register database 12 containing information indicative of its subscriber unit registration status and location.

FIG. 3 illustrates the present invention wherein a tandem services provider network interconnects a plurality of wireline and wireless carriers and includes a system for selectively directing a call originating from one of a plurality of carriers to a terminating switch presently serving a subscriber unit of another carrier. As illustrated, a carriers connected to a third party tandem services provider network, including a tandem services switch 7, maintains a subscriber unit location register database 12, containing information indicative of its subscriber unit registration status and location. For example, if that carrier is a mobile carrier, then that location register database is referred to as a VLR/HLR. For a VoIP carrier, the database may be a 911 location database. FIG. 3 shows a call that starts with a subscriber unit 1 within an originating carrier network dialing a telephone number of a subscriber unit 9 served by another switch 10 within a wireline or wireless terminating carrier network carrier network connected to the tandem services provider network. The call is routed from the subscriber unit 1 over the local loop or via wireless signal 2 between the subscriber unit 1 and an originating carrier switch 3 serving the subscriber unit 1. The originating carrier switch 3 receiving the call sends a request via SS7 4 to a routing database 5 to determine where to direct the call based on the home switch within ther terminating carrier's network associated with the called telephone number of subscriber unit 9. Upon determining to direct the call to the tandem services switch 7 in order for the call to be terminated to the terminating carrier network serving the called party associated with subscriber unit 9, the call is sent over the transport 6 connecting the originating carrier Switch 3 to the tandem services switch 7. When a call is received by the tandem services switch 7 for the subscriber unit 9 call, call delivery is momentarily suspended and an AIN Terminating Access Attempt Trigger (TAT) initiates an SS7 query 4 to an appropriate SCP 11, including an SCP database, to obtain special routing instructions. In response to the query message, SCP 11 determines the current status of the called subscriber unit 9's activity register by either querying the data within the tandem service provider SCP 11, which could be configured to regularly update its data from the called subscriber unit 9 carrier's location register database 12, or by sending the query directly to the called subscriber unit's carrier's location register database 12. If the called subscriber unit 9 is available, the SCP 11 sends the tandem services switch 7 Service Switching Point (SSP) the called subscriber unit's current service address (e.g., IP address, telephone number, location routing number) to route the call to the terminating carrier network switch 10 currently serving the called subscriber unit 9. If the unit is unavailable, the SCP 11 sends the tandem services switch 7 SSP the information to route to the terminating carrier's home switch 8 for announcement, voice mail, or other treatment.

By providing dynamic termination, the present invention provides call delivery instructions that are autonomous and not statically dictated by predetermined, geographically based routing processes. Thus, the dynamic terminating properties of the present invention are independent of a subscriber unit's geographical location and yield a higher call completion and increased service quality by directly terminating calls to the switch serving the called subscriber unit versus terminating the call based on the home switch associated with the called telephone number. This direct termination also reduces call termination expense and capital resources for the terminating carrier, who no longer has to incur the cost of back-hauling calls unnecessarily across its network.

While the best mode for carrying out the invention has been described in detail, those familiar with the art to which this invention relates will recognize various alternative designs and embodiments for practicing the invention as defined by the claims, including by any third party tandem services provider.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. In a third party tandem services network interconnecting a plurality of wireline and wireless carriers, a system for selectively directing a call originating from one of the plurality of carriers to a terminating switch presently serving a called subscriber unit of another of the plurality of carriers, said system comprising:
   a subscriber unit location register database maintained by at least one of the plurality of carriers connected to the third party tandem services network, the subscriber unit location register database containing information indicative of each subscriber unit's registration status and location for the at least one of the plurality of carriers; and
   a service control point ("SCP") in communication with the subscriber unit location register database and including an SCP database of data indicative of an availability status of the called subscriber unit,
   wherein the subscriber unit location register database provides data representative of the registration status and location of the called subscriber unit, including one of either a routing destination number and an equivalent telephone number, to the SCP for updating of the SCP database;
   wherein the SCP is arranged to access the SCP database directly when a request for call-routing information is received from a third party tandem services network switch and to provide the call-routing information to the third party tandem services network switch;
   wherein if the SCP determines that the called subscriber unit is available, the SCP sends a third party tandem services network switch service switching point ("SSP") the called subscriber unit's current service address to route the call to the terminating switch presently serving the called subscriber unit; and
   wherein if the SCP determines that the called subscriber unit is unavailable, the SCP sends a third party tandem services network switch service switching point ("SSP") the information to route the call to a home switch of the another of the plurality of carriers for at least one of an location register database announcement, a voice mail, and another call treatment.

2. In a third party tandem services network interconnecting a plurality of wireline and wireless carriers, a system for selectively directing calls originating from one of the plurality of carriers to a terminating switch presently serving a called subscriber unit of another of the plurality of carriers, said system comprising:
   a subscriber unit location register database containing information indicative of a registration status and location for each of a plurality of subscriber units for one of the plurality of carriers; and
   a service control point ("SCP") in communication with the subscriber unit location register database and including an SCP database of data indicative of an availability status of the called subscriber unit,
   wherein the SCP is arranged to access the SCP database directly when a request for call routing information is received from a third party tandem services network switch and to provide the call routing information to the third party tandem services network switch;
   wherein if the SCP determines that the called subscriber unit is available, the SCP sends a third party tandem services network switch service switching point ("SSP") the called subscriber unit's current service address to route the call to the terminating switch presently serving the called subscriber unit; and
   wherein if the SCP determines that the called-subscriber unit is unavailable, the SCP sends a third party tandem services network switch service switching point ("SSP") the information to route the call to a home switch of the another of the plurality of carriers for at least one of an announcement, a voice mail, and another call treatment.

* * * * *